(12) United States Patent
Watanabe et al.

(10) Patent No.: US 7,086,745 B2
(45) Date of Patent: Aug. 8, 2006

(54) OPTICAL COMPONENT CASING, OPTICAL DEVICE AND PROJECTOR

(75) Inventors: Nobuo Watanabe, Shiojiri (JP); Kiyotaka Nakano, Matsumoto (JP); Toshio Matsumiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 10/961,252

(22) Filed: Oct. 12, 2004

(65) Prior Publication Data

US 2005/0110962 A1    May 26, 2005

(30) Foreign Application Priority Data

Oct. 16, 2003    (JP)    ............... 2003-356205

(51) Int. Cl.
G03B 21/14    (2006.01)
G03B 21/22    (2006.01)
G02F 1/1333   (2006.01)

(52) U.S. Cl. ............... 353/119; 353/20; 349/58
(58) Field of Classification Search ............... 353/119, 353/101, 20; 359/813, 500; 349/5, 6, 7, 349/8, 9, 18, 58
See application file for complete search history.

(56) References Cited

U.S. PATENT DOCUMENTS 6,460,998 B1 * 10/2002 Watanabe ............... 353/20

2005/0105063 A1 * 5/2005 Kitabayashi ............... 353/119
2005/0134802 A1 * 6/2005 Furuta et al. ............... 353/20

FOREIGN PATENT DOCUMENTS

| JP | A 5-188344    | 7/1993 |
| JP | A 2000-39591  | 2/2000 |
| JP | A 2000-259093 | 9/2000 |
| JP | A 2001-117087 | 4/2001 |
| JP | A 2001-222061 | 8/2001 |
| JP | A 2004-138913 | 5/2004 |

* cited by examiner

*Primary Examiner*—Judy Nguyen
*Assistant Examiner*—Andrew Kong
(74) *Attorney, Agent, or Firm*—Oliff & Berridge, PLC

(57) ABSTRACT

An optical component casing includes a lower casing in which a plurality of optical components are arranged, a lid-shaped upper casing (472) that closes the lower casing, and an optical component holding frame (446) that holds an incident-side polarization plate and a visual-angle correcting plate for arranging them at predetermined positions inside the lower casing. An optical component holding frame supporting surface (4471A) is formed on an upper side of the upper casing (472) to rotatably support the optical component holding frame (446). The optical component holding frame (446) includes a polarization plate holding frame (4461) for holding the incident-side polarization plate, and a correcting plate holding frame (4462) for holding the visual-angle correcting plate. The polarization plate holding frame (4461) slides on the optical component holding frame supporting surface (4471A) of the upper casing (472) and has a rotation guiding surface (4461B2) for rotatably supporting the correcting plate holding frame (4462).

23 Claims, 9 Drawing Sheets

OPTICAL COMPONENT CASING, OPTICAL DEVICE AND PROJECTOR

BACKGROUND OF THE INVENTION

1. Field of the Invention

The present invention relates to an optical component casing, an optical device and a projector.

2. Description of Related Art

Conventionally, a projector has been used for presentations at conferences, academic societies, exhibitions and the like. Such a projector houses a plurality of optical components therein, so that a light beam irradiated by a light source is modulated and then projected in an enlarged manner to form a projected image by using these optical components.

As for these optical components, there has been used an optical modulator that modulates the light beam irradiated by the light source, and an incident-side polarization plate as well as an irradiation-side polarization plate respectively arranged on both sides of the optical modulator.

Here, the incident-side polarization plate and the irradiation-side polarization plate control a polarization direction to which the light beam enters the optical modulator and also a polarization direction to which the light beam is irradiated from the optical modulator, the respective polarization axes being arranged to be orthogonal to each other. With this configuration, high-contrast is provided for the projected image.

Accordingly, a projector provided with an adjusting mechanism for adjusting angle formed by the polarization axes of the incident-side polarization plate and the irradiation-side polarization plate has conventionally been known (for example, see JP2000-259093A).

This adjusting mechanism is provided separately from an optical component casing for housing optical components, and arranged at a predetermined position in the optical component casing. By operating, the adjusting mechanism through a hole formed on an upper side of the optical component casing, the posture of the incident-side polarization plate is adjusted relative to the irradiation-side polarization plate in a plane orthogonal to an illumination optical axis.

Nowadays, a configuration that uses a phase difference plate, a visual-angle correcting plate or the like as an optical component has been utilized for adjusting visual field angle for each of optical modulation elements, and restricting unevenness of a screen due to visual field angle dependency generated at each of the optical modulation elements to form an evenly colored projected image. For instance, the above phase difference plate, visual-angle correcting plate or the like is disposed between the incident-side polarization plate or the irradiation-side polarization plate, and the optical modulator on the illumination optical axis.

When the adjusting mechanism described in Patent Document 1 is applied to these various optical components such as the incident-side polarization plate, the phase difference plate or the visual-angle correcting plate, and the irradiation-side polarization plate, the adjusting mechanism is necessary to be arranged for each of the optical components, thus requiring a wide space in the optical component casing. Accordingly, the optical component casing may grow in size, and disturb downsizing of the projector.

Further, in order to attach each of the adjusting mechanisms to the optical component casing, a plurality of attachments corresponding to the adjusting mechanisms must be formed in the optical component casing, or a plurality of fixing members such as screws are necessary for fixing the adjusting mechanisms to the optical component casing. Therefore, it is difficult to decrease the production cost of the projector due to forming of the plurality of attachments as well as the necessity of the plurality of fixing members.

In this point of view, an object of the present invention is to provide an optical component casing, an optical device and a projector that can decrease the size and the production cost thereof.

SUMMARY OF THE INVENTION

An optical component casing according to an aspect of the present invention with an illumination optical axis of a light beam irradiated by a light source being set therein, in which a plurality of optical components are housed and arranged at predetermined positions on the illumination optical axis, the casing includes: a lower casing in which the plurality of optical components are housed; a lid-shaped upper casing that closes the lower casing; an optical component holding frame that holds at least one of the plurality of optical components and arranges the optical component at a predetermined position inside the lower casing, in which an optical component holding frame supporting surface, which is a curved surface being circular around the illumination optical axis of the light beam as the center to rotatably support the optical component holding frame, is formed on an upper side of the upper casing, the optical component holding frame includes a first holding frame for holding one of the plurality of optical components and a second holding frame for holding the other optical component arranged closely to the optical component held by the first holding frame, and the one of the first and second holding frames slides on the optical component holding frame supporting surface of the upper casing, is formed as a curved surface being circular around the illumination optical axis of the light beam as the center, and has a rotation guiding surface that rotatably supports the other one holding frame.

Here, the optical components include various components such as a polarization plate, a phase difference plate and an optical compensation section (visual-angle correcting plate, color correction film or the like).

According to the above aspect of the present invention, the optical component casing includes the lower casing, the upper casing with the optical component holding frame supporting surface formed on the upper side thereof, and the optical component holding frame constituted of the first holding frame and the second holding frame. The one of the first and second holding frames slides on the optical component holding frame supporting surface of the upper casing, and has the rotation guiding surface for rotatably supporting the other holding frame. Owing to this, the first holding frame and the second holding frame of the optical component holding frame are integrally formed through the rotation guiding surface formed on the one holding frame so as to hold the two optical components closely arranged out of the plurality of optical components. Therefore, in compared to a configuration in which the two optical components are independently held by two adjusting mechanisms in a conventional manner, a wide space is not necessary in the optical component casing, thus downsizing the optical component casing.

Additionally, if the other holding frame is fixed to the one holding frame, only the attachment for the one holding frame is required to be formed on the upper casing or the lower casing, and the attachment for the other holding frame is not required to be formed on the upper casing or the lower casing. Further, if the other holding frame is fixed to the one holding frame by bonding or the like, only the fixing member for the one holding frame is required as the fixing member for fixing the optical component holding frame to the upper casing or the lower casing, thus omitting the fixing member for the other holding frame. Therefore, the attachment and the fixing member can appropriately be omitted, and consequently, the production cost of the projector can be decreased.

Preferably, in the optical component casing according to the above aspect of the present invention, a first curved surface may be formed on the one holding frame, the first curved surface abutting on the optical component holding frame supporting surface of the upper casing to rotate the optical component around a light-incident direction of the optical component held by the one holding frame as an axis, and the rotation guiding surface may be formed on an end surface facing to the first curved surface.

With this arrangement, since the first curved surface is formed on the one holding frame corresponding to the optical component holding frame supporting surface of the upper casing, the one holding frame can be rotated along the optical component holding frame supporting surface of the upper casing, so that the position of the optical component held by the one holding frame can be adjusted easily and highly accurately with a simple structure.

Additionally, since the rotation guiding surface is formed on the end surface facing to the first curved surface, in the case that a part of the one holding frame is curved around the illumination optical axis of the light beam as the center, the curved internal end surface can be defined as the first curved surface, and the curved external end surface can be defined as the rotation guiding surface, thereby easily manufacturing the one holding frame.

Further, since the optical component holding frame supporting surface is formed on the upper side of the upper casing, and the rotation guiding surface is formed on the end surface of the one holding frame, the end surface facing to the first curved surface to be abutted on the optical component holding frame supporting surface, the one holding frame can easily be arranged on the upper casing from the upper side of the upper casing, and the other holding frame can easily be arranged on the one holding frame from the upper side of the one holding frame. Therefore, the optical component holding frame can easily be attached and detached relative to the upper casing, thus easily replacing the optical components held by the optical component holding frame.

Preferably, in the optical component casing according to the above aspect of the present invention, a second curved surface may be formed on the other holding frame, the second curved surface abutting on the rotation guiding surface of the one holding frame to rotate the optical component around a light-incident direction of the optical component held by the other holding frame as an axis.

With this arrangement, since the second curved surface is formed on the other holding frame corresponding to the rotation guiding surface of the one holding frame, the other holding frame can be rotated along the rotation guiding surface of the one holding frame, so that the position of the optical component held by the other holding frame can be adjusted easily and highly accurately with a simple structure.

Preferably, in the optical component casing according to the above aspect of the present invention, elongated holes may be respectively formed on the first holding frame and the second holding frame to extend along a rotating direction with at least parts of elongated holes being interfered with each other in a plane, and a fixing member attachment for attaching a fixing member inserted through the elongated holes for fixing both of the first holding frame and the second holding frame may be formed on the optical component holding frame supporting surface of the upper casing.

With this arrangement, the elongated holes are respectively formed on the first holding frame and the second holding frame, and at least parts of the elongated holes are interfered with each other in a plane. Besides, the fixing member attachment for attaching the fixing member to be inserted through the elongated holes is formed on the optical component holding frame supporting surface of the upper casing. Owing to this, both of the first holding frame and the second holding frame are fixed by the single fixing member. Consequently, the production cost of the projector can be decreased by decreasing the number of the fixing members required, and the respective holding frames can be fixed on the upper casing at the optimum positions for the optical components in accordance with the rotation of the respective holding frames.

Preferably, in the optical component casing according to the above aspect of the present invention, the fixing member may be attached to the fixing member attachment by a screwing structure.

With this arrangement, since the fixing member is attached to the fixing member attachment due to the screwing structure, for instance, even when at least one of the optical components held by the optical component holding frame is displaced from the predetermined position on the illumination optical axis, the position of the optical component can easily be corrected by loosing the screwing state of the fixing member. Additionally, the optical component can be replaced only by loosing and removing the fixing member, and the holding frame can easily be attached and detached. Therefore, in compared to a configuration of bonding and fixing the respective holding frames with an adhesive or the like, the respective holding frames can be attached and detached to the upper casing easily and quickly.

Further, since the elongated holes are respectively formed on the holding frames, the positions of the optical components can be adjusted with the screwing state of the fixing member loosen, thus easily adjusting the positions of the optical components and fixing the optical components easily and tightly after the position adjustment.

Preferably, in the optical component casing according to the above aspect of the present invention, an adjuster tip supporting portion that supports a tip end of a stick-shaped adjuster for adjusting the position of the optical component may be formed on the upper side of the upper casing as a supporting point when the adjuster moves, and a cut portion, to which the adjuster is inserted and a lateral side of the adjuster is abutted, may be formed on the one holding frame.

Here, the adjuster may be, for example, a tool such as a screwdriver as long as the adjuster is stick-shaped.

With this arrangement, since the adjuster tip supporting portion is formed on the upper casing whereas the cut portion is formed on the one holding frame, for example, the adjuster such as the screwdriver is inserted to the cut portion of the one holding frame, the tip end of the adjuster is supported by the adjuster tip supporting portion, and the adjuster is moved around the adjuster tip supporting portion as the center, so that the lateral side of the adjuster is abutted on the lateral side of the cut portion, the one holding frame can be moved in a moving direction of the adjuster, and the one holding frame can be slid on the optical component supporting surface. In other words, the one holding frame is rotated, so that the position of the optical component held by the one holding frame can easily be adjusted. Additionally, even though an optical axis adjuster dedicated to move the one holding frame is not used, the position of the optical component can easily be adjusted.

Preferably, in the optical component casing according to the above aspect of the present invention, a movement operating portion may be formed on the other holding frame, the movement operating portion projecting upward for sliding the other holding frame on the rotation guiding surface of the one holding frame.

With this arrangement, since the movement operating portion is formed on the other holding frame, for instance, the other holding frame can be slid on the rotation guiding surface by gripping the movement operating portion with a hand and moving the movement operating portion. In other words, the other holding frame is rotated, so that the position of the optical component held by the other holding frame can easily be adjusted. Accordingly, even though an optical axis adjuster dedicated to move the other holding frame is not used, the position of the optical component can easily be adjusted.

An optical device according to another aspect of the present invention includes: a plurality of optical components arranged on an optical path of a light beam irradiated by a light source; and the above-described optical component casing in which the plurality of optical components are housed.

According to the above aspect of the present invention, since the optical device has the above-described optical component casing, the same functions and advantages as the above-described optical component casing can be obtained.

Further, since the optical device is provided with the optical component casing that can adjust the positions of the optical components, the displacement of the optical components can be prevented, thus forming a fine optical image.

Preferably, in the optical device according to the above aspect of the present invention, the plurality of optical components may include: an optical modulator that modulates the light beam irradiated by the light source in accordance with image information; a polarization plate that converts a polarization axis of the incident light beam; and an optical compensation section that enlarges visual field angle of the light beam irradiated from the optical modulator, in which the optical component holding frame holds the polarization plate and the optical compensation section.

Here, the polarization plate may employ either an incident-side polarization plate or an irradiation-side polarization plate disposed on the upstream or the downstream of the optical modulator.

Besides, the optical compensation section may employ a visual-angle correcting plate or the like interposed between the incident-side polarization plate or the irradiation-side polarization plate, and the optical modulator.

The optical component holding frame may hold the two optical components closely arranged. For example, the first holding frame may hold the incident-side polarization plate and the second holding frame may hold the visual-angle correcting plate, or alternatively, the first holding frame may hold the irradiation-side polarization plate and the second holding frame may hold the visual-angle correcting plate. In particular, it is preferable to hold the incident-side polarization plate by the first holding frame and to hold the visual-angle correcting plate by the second holding frame.

With this arrangement, since the optical component holding frame holds the polarization plate and the optical compensation section, for instance, when the first holding frame holds the incident-side polarization plate and the second holding frame holds the visual-angle correcting plate, the angle of the polarization axis of the incident-side polarization plate can be adjusted relative to the irradiation-side polarization plate by rotating the first holding frame relative to the upper casing as well as the visual field angle can be adjusted according to the visual-angle correcting plate by rotating the second holding frame relative to the first holding frame. Accordingly, the optical device can form an optical image with enhanced contrast and appropriate visual filed angle.

A projector according to still another aspect of the present invention includes: a light source; an optical modulator that forms an optical image by modulating a light beam irradiated by the light source in accordance with image information; a projection optical device that projects the optical image formed by the optical modulator in an enlarged manner; and the above-described optical device.

According to the above aspect of the present invention, since the projector has the above-described optical device, the same functions and advantages as the above-described optical device can be obtained.

Further, in the case of a three-plate projector provided with three optical modulators and a color-combining optical device for combining modulation light modulated by the optical modulators, if the positions of the polarization plates and the visual-angle correcting plates are respectively adjusted by the three optical component holding frames to correspond to the respective optical modulators, high-contrast ratio can be provided and unevenness on a screen due to visual field angle dependency generated at each of the optical modulators can be restricted to form an evenly colored projected image.

DETAILED DESCRIPTION OF PREFERRED EMBODIMENT(S)

An embodiment of the present invention will be described below with reference to the attached drawings.

[Major Components of Projector]

Figure 1:
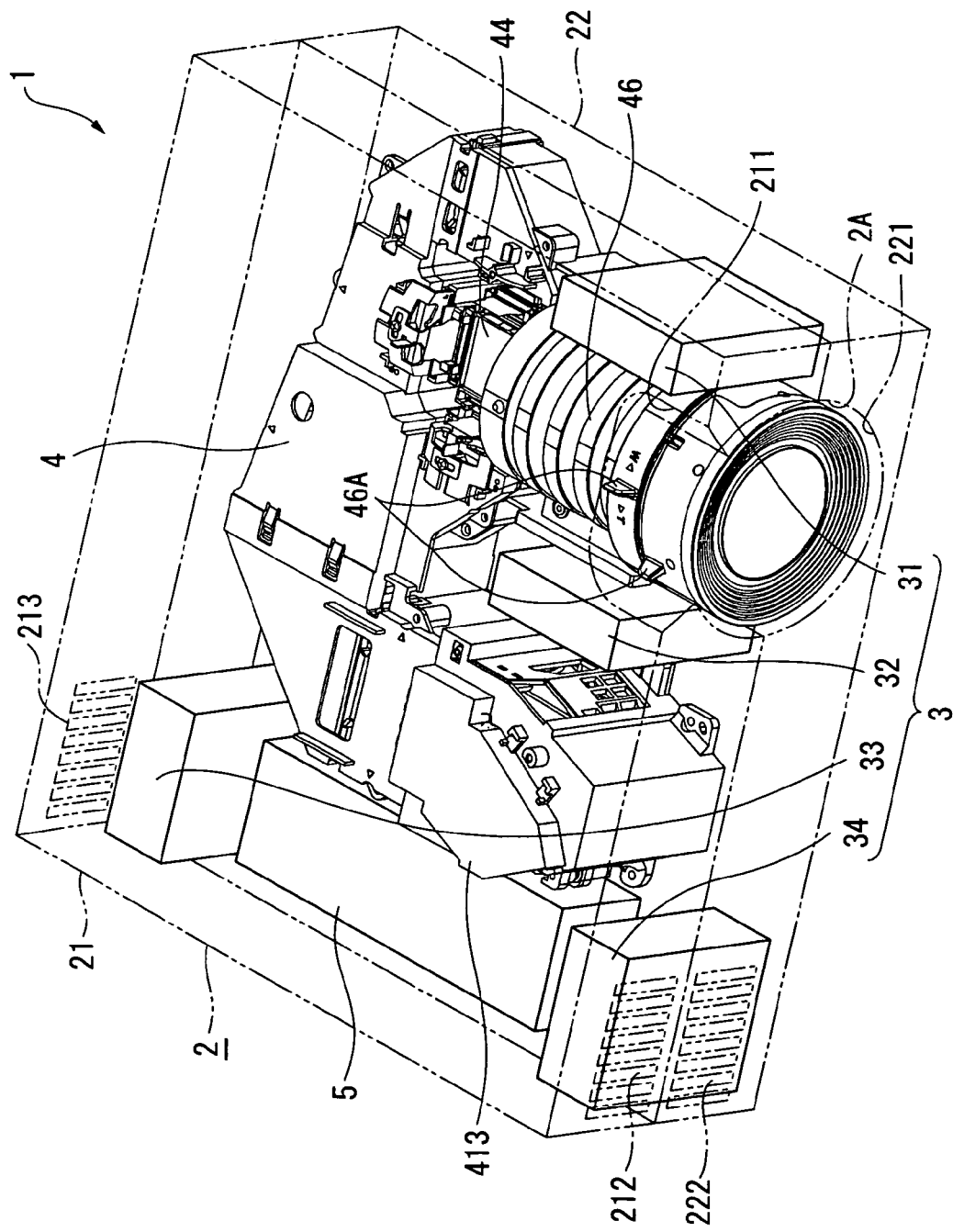
FIG. 1 is an illustration showing the brief configuration of a projector according to an embodiment.

FIG. 1 is an illustration showing the brief configuration of a projector 1 according to the present embodiment.

The projector 1 includes a substantially rectangular parallelepiped exterior case 2, a cooling unit 3 for cooling the heat stayed inside the projector 1, an optical unit 4 as an optical device that forms an optical image in accordance with image information by optically processing a light beam irradiated by a light source, and a power supply unit 5 that supplies electric power supplied from the outside to the components of the projector 1 via a power supply cable (not shown).

The exterior case 2, which is made of metal, includes an upper case 21 forming the top side, the front side, the lateral sides and the rear side of the projector 1, and a lower case 22 forming the bottom side, the front side, the lateral sides and the rear side of the projector 1. These cases 21 and 22 are fixed with each other by screws. Note that, the exterior case 2 may be made of synthetic resin without limiting to metal.

A cut portion 211 is formed on the front side of the upper case 21 to form a circular opening 2A in the state that the upper case 21 is assembled with the lower case 22, a part of a projection lens (described below) of the optical unit 4 disposed inside the exterior case 2 being exposed to the outside through this opening 2A. The focus of the projection lens can manually be adjusted by a lever of the projection lens, the lever being a part of the exploded portion. Additionally, an exhaust port 212 is formed on the other side of the opening 2A to discharge the air heated inside the projector 1 by the cooling unit 3.

An intake port 213 is formed on the rear side of the upper case 21 at the position facing to the power supply unit 5 (on the left side in FIG. 1) to suck cooling air from the outside by the cooling unit 3. Though not shown, a connector for connecting a computer, and various types of terminals for connecting equipments such as a video input terminal, a terminal for connecting an audio equipment etc. are provided on the rear side of the upper case 21, whereas an interface board installing a signal processing circuit for processing a signal of image and the like is disposed inside the rear side of the upper case 21.

Though not shown, an intake port is formed on the bottom side of the lower case 22 located on the lower side of an electric optical device (described later) of the optical unit 4 to suck the cooling air from the outside by the cooling unit 3.

Though not shown, an intake port is formed on the rear side of the lower case 22 to suck the cooling air from the outside by the cooling unit 3, this intake port being formed continuously with the intake port 213 formed on the rear side of the upper case 21.

A cut portion 221 is formed on the front side of the lower case 22 to form the circular opening 2A continuously with the above-described cut portion 211 in the state that the lower case 22 is assembled with the lower case 22. Additionally, an exhaust port 222 is formed on the other side of the opening 2A to discharge the air heated inside the projector 1 to the outside by the cooling unit 3, the exhaust port 222 being formed continuously with the exhaust port 212 formed on the front side of the upper case 21.

The cooling unit 3 sends the cooling air to a cooling channel formed inside the projector 1 to cool the heat generated inside the projector 1. The cooling unit 3, which is located beside the projection lens (described later) of the optical unit 4, includes a pair of sirocco fans 31 and 32 that suck the cooling air from the intake port (not shown) formed on the bottom side of the lower case 22, an intake axial-flow fan 33 that sucks the cooling air from the intake port 213 formed on the rear side the lower case 22, and an exhaust axial-flow fan 34 located nearby the front side of the exterior case 2 to attract the air inside the projector 1 and discharge the heated air from the exhaust ports 212 and 222 formed on the front side of the exterior case 2.

The power supply unit 5 is disposed inside the projector 1 to extend from the rear side to the front side of the exterior case 2. Though not shown, the power supply unit 5 includes a power supply for supplying the electric power supplied from the outside via the power supply cable to the components of the projector 1, and a lamp driving circuit for supplying the electric power supplied from the power supply to an optical device (described later) of the optical unit 4. Though not shown, the power supply and the lamp driving circuit are covered by a shield member made of metal such as aluminum with both ends opened. This shield member guides the cooling air sucked from the intake axial-flow fan 33 of the cooling unit 3 and also restricts electromagnetic noise generated at the power supply and the lamp driving circuit from leaking to the outside.

Figure 2:
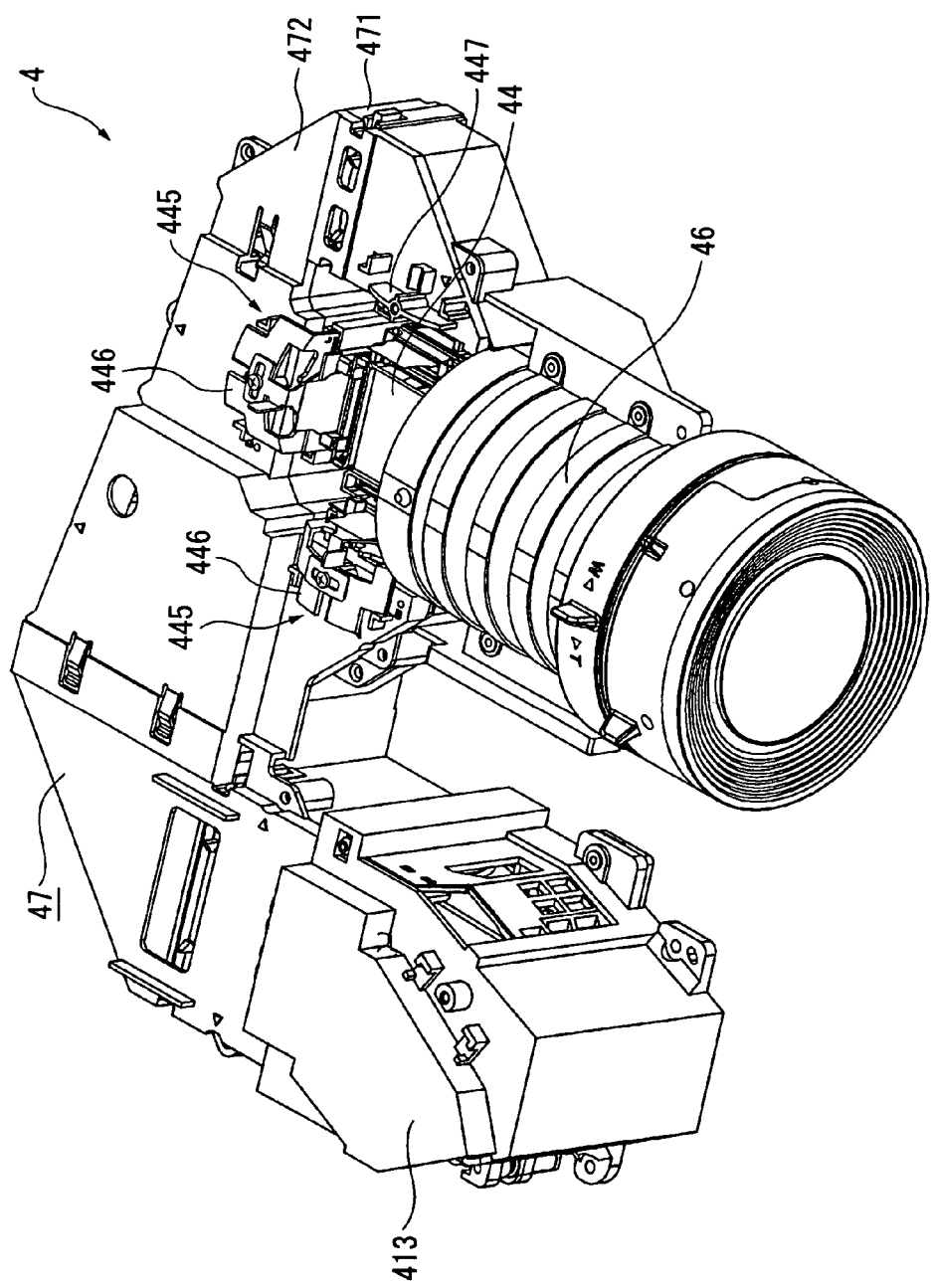
FIG. 2 is a perspective view showing the upper side of an optical unit of the aforesaid embodiment.

FIG. 2 is a perspective view showing the upper side of the optical unit 4.

Though described later in detail, the optical unit 4 is a unit that optically processes the light beam irradiated by the light source to form an optical image in accordance with image information and projects the optical image in an enlarged manner. As shown in FIG. 1 or 2, this optical unit has a substantially U-shape in plane view, this U-shape extending from the front side to the rear side, extending along the rear side, and then further extending from rear side to the front side in the exterior case 2. Though not shown, the optical unit 4 is electrically connected to the power supply unit 5. A control board, which is disposed on the upper side of the optical unit 4, acquires the image information for controlling and computing the image information and controls below-described respective liquid crystal panels (optical modulators) in order to project the optical image in accordance with the image information.

[Configuration of Optical Unit]

Figure 3:
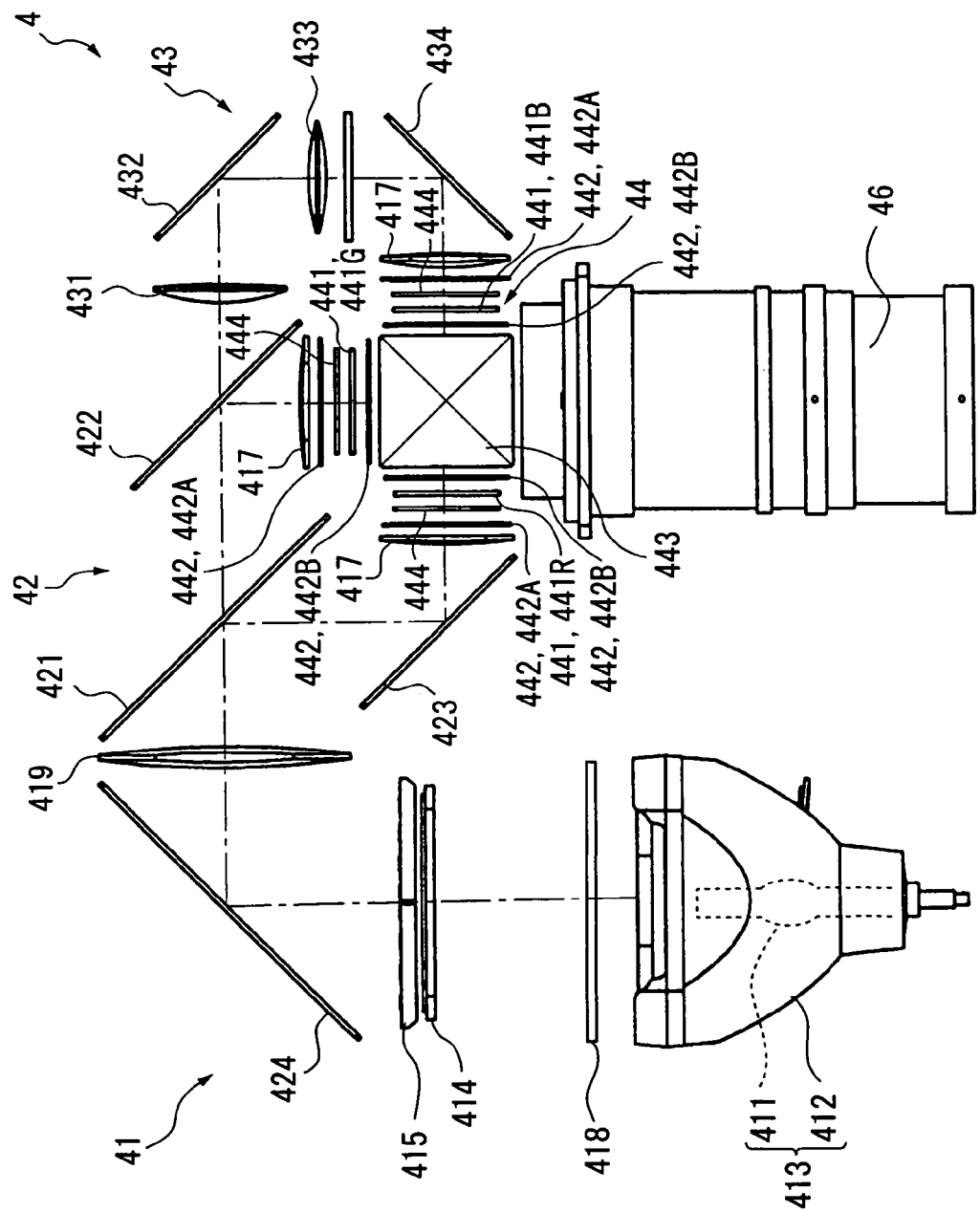
FIG. 3 is a schematic illustration showing an optical system of the optical unit of the aforesaid embodiment.

FIG. 3 is a schematic illustration showing an optical system of the optical unit 4.

The optical unit 4 includes an integrator illuminating optical system 41, a color-separating optical system 42, a relay optical system 43, an electric optical device 44, a projection lens 46 (projection optical device), and an optical component casing 47 (FIG. 2) made of synthetic resin for housing the optical components 41 to 44 and for supporting and fixing the projection lens 46 at a predetermined position.

The integrator illuminating optical system 41 is an optical system for substantially uniformly illuminating image formation areas of the respective optical modulators (described later) of the electric optical device 44. The integrator illuminating optical system 41 has a light source device 413, a first lens array 418, a second lens array 414, a polarization converter 415, a reflection mirror 424 and a superposing lens 419.

The light source device 413 includes a light source lamp 411 as a radial light source that irradiates a radial light beam and a reflector 412 that reflects the radial light irradiated by the light source lamp 411. Here, a halogen lamp, a metal halide lamp or a high-pressure mercury lamp is often used as the light source lamp 411.

A parabolic mirror is used for the reflector 412. A combination of an ellipsoidal mirror and a parallelizing concave lens may be used instead of the parabolic mirror.

The first lens array 418 has small lenses arranged in a matrix, the lenses having substantially rectangular profile seen in an optical axis direction. The respective lenses separate the light beam irradiated by the light source lamp 411 into a plurality of sub-beams.

The second lens array 414 is arranged approximately in the same manner as the first lens array 418, which includes small lenses arranged in a matrix. The second lens array 414 focuses the image of the small lenses of the first lens array 418 onto the liquid crystal panels (described later) together with the superposing lens 419.

The polarization converter 415 is disposed on the downstream of the second lens array 414. The polarization converter 415 converts the light from the second lens array 414 into a substantially uniform polarized light, thereby enhancing the light utilization efficiency of the electric optical device 44.

Specifically, the respective sub-beams converted into the substantially uniform polarized light by the polarization converter 415 is substantially superposed on the liquid crystal panels (described later) of the electric optical device 44 by the superposing lens 419 finally. Since only one-type of polarized light can be used in the projector 1 of the present invention using the liquid crystal panels that convert a polarized light, approximately half of the light beam from the light source lamp 411 emitting random polarized light cannot be used. Accordingly, with the use of the polarization converter 415, the light beam irradiated by the light source lamp 411 is converted into the substantially uniform polarized light to enhance the light utilization efficiency of the electric optical device 44.

The color-separating optical system 42, which has two dichroic mirrors 421 and 422, and a reflection mirror 423, separates the plurality of sub-beams irradiated from the integrator illuminating optical system 41 by the dichroic mirrors 421 and 422 into three color lights of red, green and blue. The relay optical system 43 has an incident-side lens 431, a relay lens 433 and reflection mirrors 432 and 434, and guides the color light separated by the color-separating optical system 42 toward the liquid crystal panel for blue light.

At this time, the dichroic mirror 421 of the color-separating optical system 42 transmits the blue light component and green light component of the light beam irradiated from the integrator illuminating optical system 41 and reflects the red light component. The red light reflected by the dichroic mirror 421 is reflected by the reflection mirror 423, and reaches to the liquid crystal panel for red light through the field lens 417. The field lens 417 converts the respective sub-beams irradiated from the second lens array 414 into a light beam parallel to the central axis (main beam) thereof. The field lenses 417 provided on the light-incident side of other liquid crystal panels for green light and blue light function in the same manner.

In the blue and green lights transmitted through the dichroic mirror 421, the green light is reflected by the dichroic mirror 422 to reach the liquid crystal panel for green light through the field lens 417. On the other hand, the blue light passes through the dichroic mirror 422 and then the relay optical system 43 to reach the liquid crystal panel for blue light through the field lens 417. The relay optical system 43 is used for the blue light in order to avoid deterioration in the light utilization efficiency on account of light dispersion and the like caused by the longer length of the optical path of the blue light than the optical path of the other color light. In other words, the relay optical system 43 is used for directly transmitting the sub-beams incident on the incident-side lens 431 to the field lens 417. Incidentally, though the blue light of the three color lights passes through the relay optical system 43, the red light, for instance, may alternatively pass through the relay optical system 43.

The electric optical device 44 includes three liquid crystal panels 441 (441R representing the liquid crystal panel for red light, 441G representing the liquid crystal panel for green light, and 441B representing the liquid crystal panel for blue light), which are three optical modulators, polarization plates 442, a visual-angle correcting plate 444 and a cross dichroic prism 443.

The liquid crystal panels 441R, 441G and 441B each use, for instance, polycrystalline silicon TFT as a switching element. The respective color lights separated by the color-separating optical system 42 are modulated in accordance with image information to form an optical image with the use of the three liquid crystal panels 441R, 441G and 441B, the polarization plates 442 provided on the light-incident side and on the light-irradiation side.

The polarization plates 442 include an incident-side polarization plate 442A and an irradiation-side polarization plate 442B respectively disposed on the upstream and the downstream of the liquid crystal panels 441 (441R, 441G and 441B).

The incident-side polarization plate 442A transmits a polarized light in a predetermined direction out of the respective color lights separated by the color-separating optical system 42 and absorbs the other light beam, the incident-side polarization plate 442A having a substrate made of crystal, sapphire glass or the like with a polarization film attached. The incident-side polarization plate 442A is disposed such that the position thereof can be adjusted relative to a predetermined illumination optical axis set inside the optical component casing 47 by a position adjusting mechanism (described later) of the optical component casing 47. The position adjusting mechanism will be described when the optical component casing 47 is described.

The irradiation-side polarization plate 442B is also arranged approximately in the same manner as the incident-side polarization plate 442A, which transmits the polarized light in a predetermined direction out of the light beam irradiated by the liquid crystal panels 441 (441R, 441G and 441B) and absorbs the other light beam. Alternatively, a polarization film may be attached on the cross dichroic prism 443 without using a substrate.

The incident-side polarization plate 442A and the irradiation-side polarization plate 442B are arranged so that the directions of the polarization axes thereof are orthogonal with each other.

The visual-angle correcting plate 444 has a substrate on which an optical conversion film is formed, the optical conversion film for correcting the visual field angle of the optical image formed by the liquid crystal panels 441 (441R, 441G and 441B). By providing the visual-angle correcting plate 444, the light leakage on a black screen can be diminished and the contrast of the projected image can be greatly improved. The visual-angle correcting plate 444 is disposed such that the position thereof can be adjusted relative to the predetermined illumination optical axis set inside the optical component casing 47 by the position adjusting mechanism (described later) of the optical component casing 47 in the substantially same manner as the incident-side polarization plate 442A. The position adjusting mechanism will be described when the optical component casing 47 is described.

The cross dichroic prism 443 combines the image modulated for the respective color lights irradiated by the three liquid crystal panels 441R, 441G and 441B to form a color image. In the cross dichroic prism 443, a dielectric multi-layer film for reflecting the red light and a dielectric multi-layer film for reflecting the blue light are formed along the boundaries of four right-angle prisms substantially in X-shape, the dielectric multi-layer films combining the three color lights.

The projection lens 46 is a lens set combining a plurality of lenses, which projects in an enlarged manner the color image combined by the cross dichroic prism 443 on a screen. The projection lens 46 is provided with a lever 46A for changing the relative position of the plurality of lenses so that the focus and magnification of the projected color image can be adjusted.

The above-described optical systems 41 to 44 are housed in the optical component casing 47.

The optical component casing 47 includes a lower casing 471 (FIG. 2) provided with grooves so that the above-described optical components 414 to 419, 421 to 423 and 431 to 434 are slid and fit thereto, an upper casing 472 (FIG. 2) formed in a lid-shape for closing an upper opening of the lower casing 471, and a position adjusting mechanism 445 (FIG. 2) that adjusts the both positions of the incident-side polarization plate 442A and the visual-angle correcting plate 444.

The light source device 413 is housed on an end of the optical component casing 47 having U-shape in plane view, and the projection lens 46 is fixed on the other end thereof at a predetermined position relative to the illumination optical axis set inside the optical component casing 47. Additionally, the electric optical device 44 is fixed on the upstream of the projection lens 46 on the optical path.

[Structure of Position Adjusting Mechanism]

Figure 4:
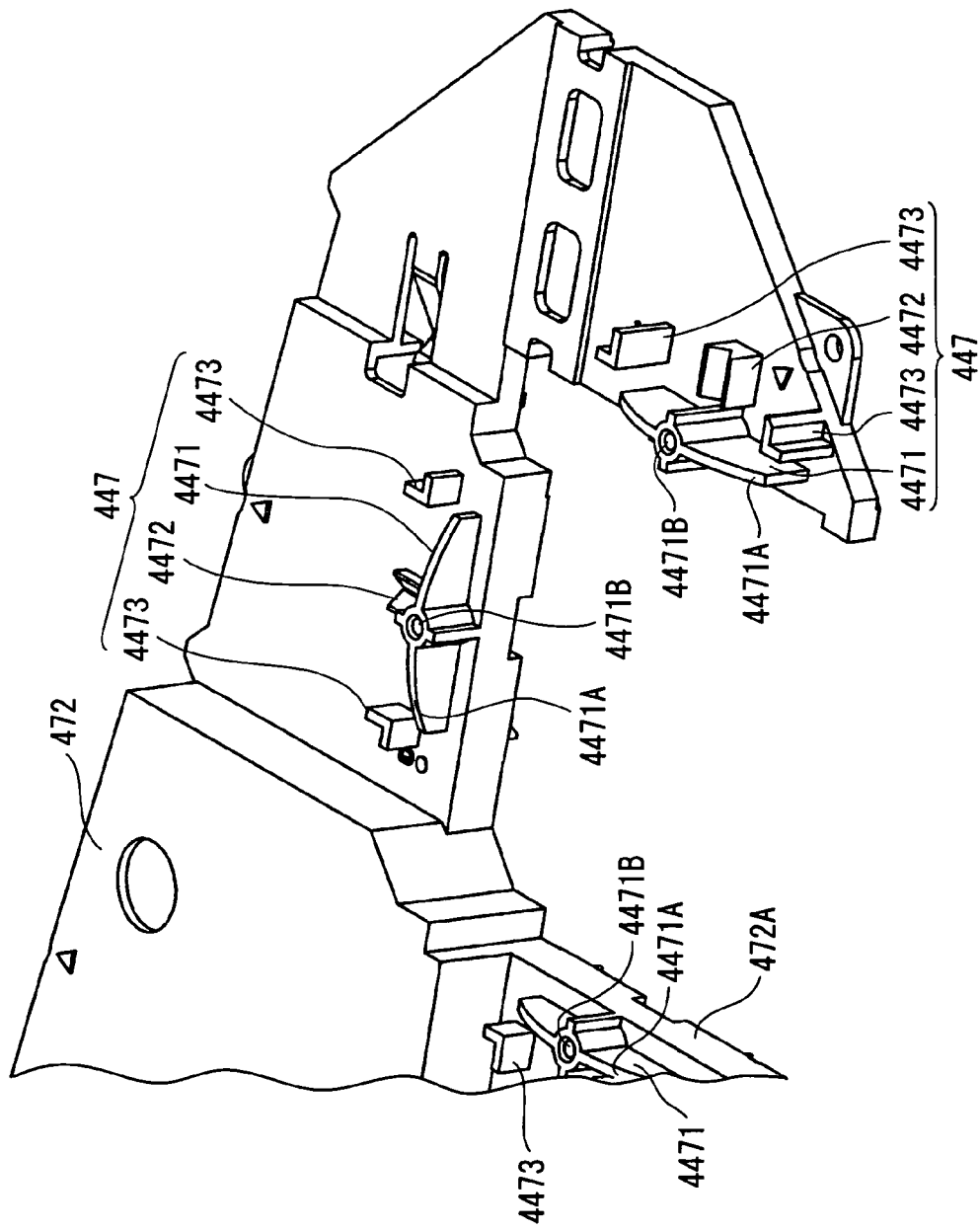
FIG. 4 is an illustration explaining a position adjusting mechanism of the aforesaid embodiment.
Figure 5:
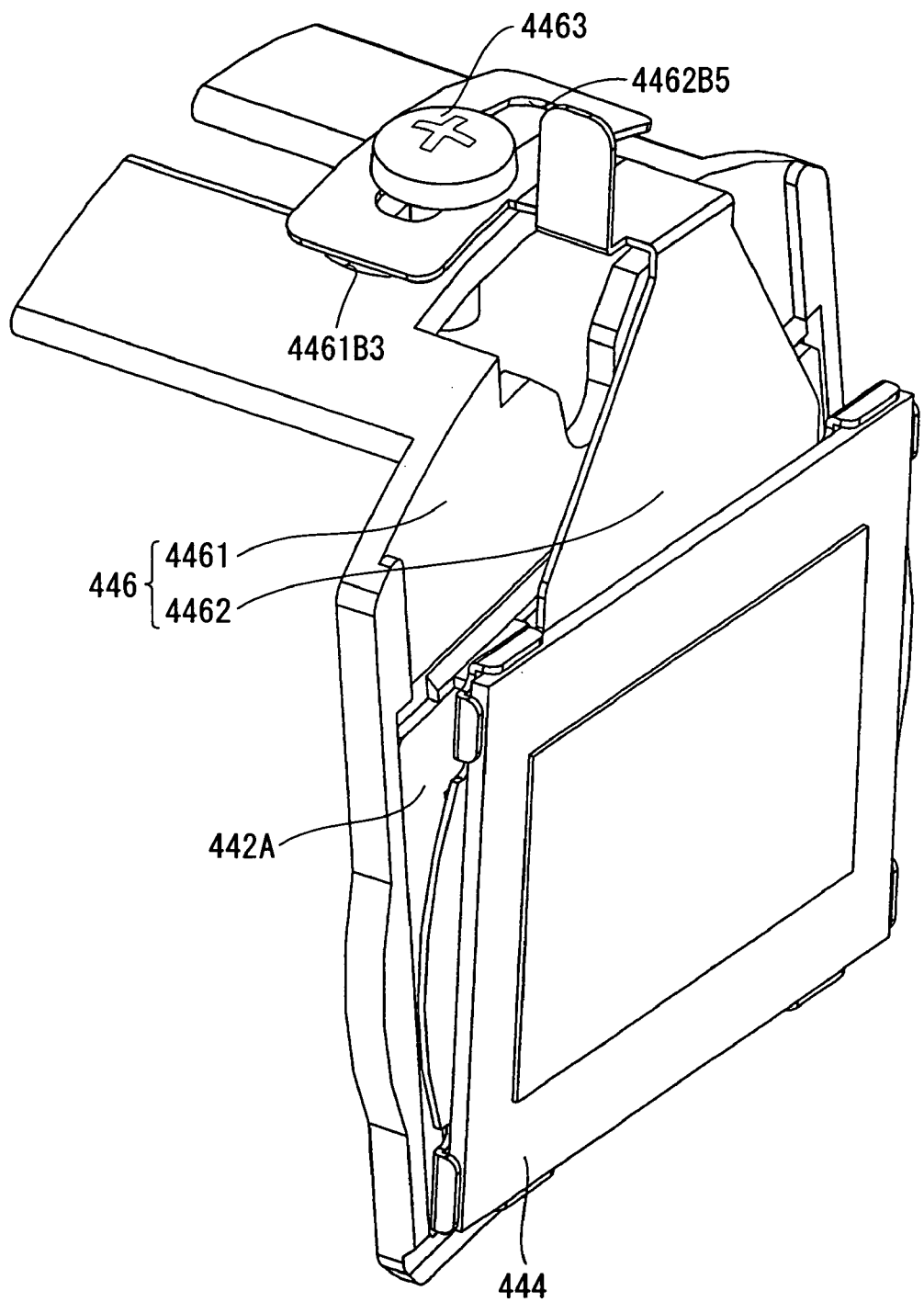
FIG. 5 is an illustration explaining the position adjusting mechanism of the aforesaid embodiment.
Figure 6:
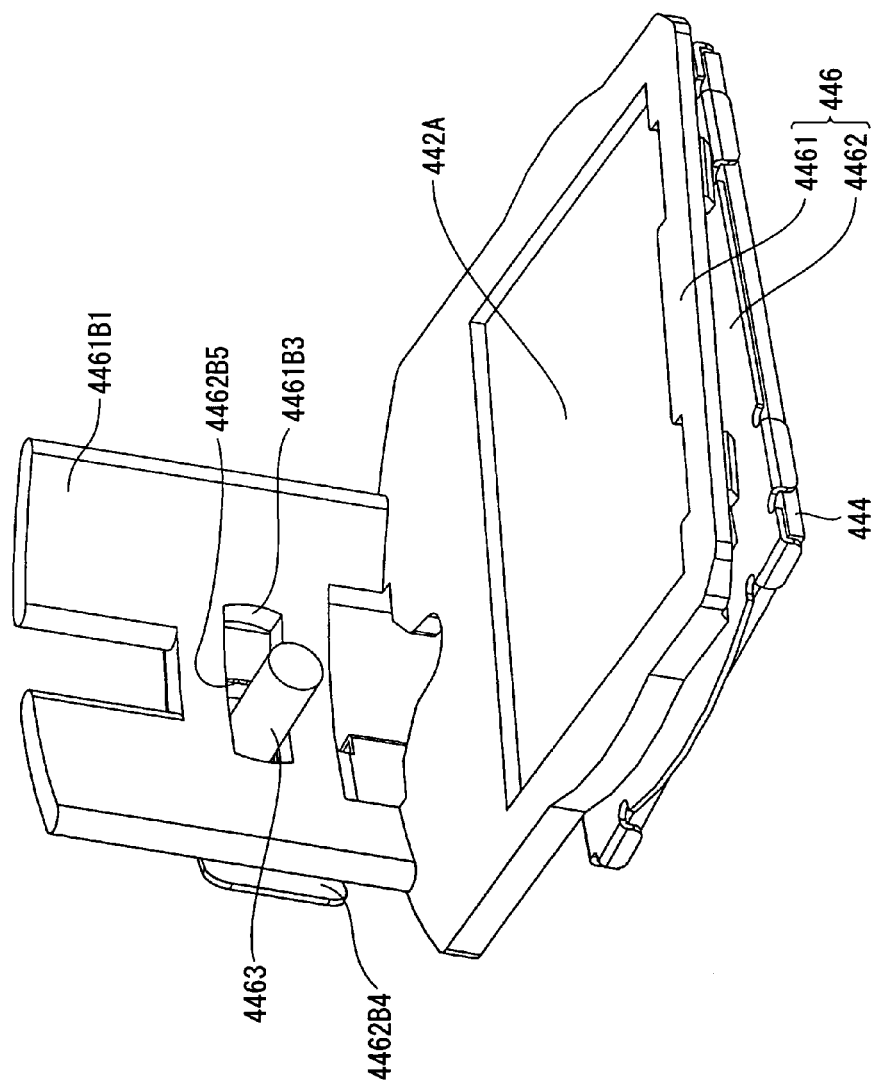
FIG. 6 is an illustration explaining the position adjusting mechanism of the aforesaid embodiment.

FIGS. 4 to 6 are illustrations each explaining the position adjusting mechanism 445. To be more specific, FIG. 4 is an illustration showing a part of the upper casing 472 on the side of the electric optical device 44 seen from the above. FIG. 5 is a perspective view showing the upper side of an optical component holding frame 446 of the position adjusting mechanism 445. FIG. 6 is a perspective view showing the lower side of the optical component holding frame 446 of the position adjusting mechanism 445.

As shown in FIG. 2, the position adjusting mechanism 445 consists of the optical component holding frame 446 for holding both of the incident-side polarization plate 442A and the visual-angle correcting plate 444, and a holding frame posture adjuster 447 for supporting the optical component holding frame 446 such that the posture of the optical component holding frame 446 can be adjusted. In FIG. 2, the optical component holding frame 446 is omitted from the position adjusting mechanism 445 on the side of the liquid crystal panel 441B to draw the holding frame posture adjuster 447 particularly.

As shown in FIGS. 2 and 4, the upper casing 472 closes a part of the opening of the lower casing 471, where the above-described optical components 414 to 419, 421 to 423 and 431 to 434 are housed. In other words, as shown in FIGS. 2 and 4, the upper casing 472 closes the part of the opening of the lower casing 471 extending from the downstream of the light source device 413 to the upstream of the electric optical device 44 on the optical path, so that a substantially rectangular opening 472A (FIG. 4) is formed on the upper side of the electric optical device 44 so as to surround the electric optical device 44 in plane view when the lower casing 471 is assembled with the upper casing 472.

As shown in FIGS. 2 and 4, the three holding frame posture adjusters 447 are provided on the upper side of the upper casing 472 nearby the opening 472A of the upper casing 472. Each of the holding frame posture adjusters 447 includes a holding frame supporting portion 4471 for movably supporting the optical component holding frame 446, an adjuster tip supporting portion 4472 for supporting a tip end of a screwdriver or the like, and a rotation restricting portion 4473 for defining a terminal position of the optical component holding frame 446 during the movement.

The holding frame supporting portion 4471 stands on the upper side of the upper casing 472 along a plane parallel to the opening 472A of the upper casing 472 and a plane orthogonal to that plane, and is formed in a substantially cross-shape in plane view. An optical component holding frame supporting surface 4471A is formed on the upper side of the holding frame supporting portion 4471, the optical component holding frame supporting surface 4471A being circular in plane view and bulging upward around the illumination optical axis of the light beam irradiated by the light source device 413 as the center. A fixing hole 4471B is formed substantially at the center of the optical component holding frame supporting surface 4471A as a fixing member attachment extending toward the lower side. This fixing hole 4471B has a screwing structure such as a screw hole.

The adjuster tip supporting portion 4472 is located on the upstream of the holding frame supporting portion 4471 on the optical path (in a direction away from the opening 472A of the upper casing 472), and stands on the upper side of the upper casing 472. A substantially V-shaped cut portion is formed on the upper side of the adjuster tip supporting portion 4472, the valley of the cut portion extending in a direction orthogonal to the opening 472A of the upper casing 472, and the center of the holding frame supporting portion 4471 being substantially located on an extension of the valley.

The rotation restricting portions 4473 are respectively located on the both sides of the adjuster tip supporting portion 4472 and stands on the upper side of the upper casing 472. The rotation restricting portion 4473 is formed in a substantially L-shape in plane view such that the lateral side of the L-shape is perpendicular to the valley of the cut portion formed on the upper side of the adjuster tip supporting portion 4472. This rotation restricting portion 4473 defines the terminal position of the optical component holding frame 446 in the moving direction thereof and inhibits the displacement of the optical component holding frame 446 by abutting on an end surface of a first holding frame projecting portion (described below) of the optical component holding frame 446. Note that, the rotation restricting portion 4473 may be a substantially I-shape in plane view without limiting to the substantially L-shape in plane view. In other words, the rotation restricting portion 4473 is not limited to the L-shape as long as each of the lateral sides thereof is disposed to be perpendicular to the valley of the cut portion formed on the upper side of the adjuster tip supporting portion 4472. Further, the terminal position of the optical component holding frame 446 in the moving direction can be defined by a track hole 4461B3 of the polarization plate holding frame 4461. If the dimension (length) of the track hole 4461B3 is set to a predetermined dimension, it is possible to omit the rotation restricting portion 4473.

The optical component holding frame 446 is rotatably supported by the holding frame posture adjuster 447 for holding the incident-side polarization plate 442A and the visual-angle correcting plate 444 so as to adjust the postures thereof. As shown in FIGS. 5 and 6, the optical component holding frame 446 includes a polarization plate holding frame 4461 as a first holding frame for holding the incident-side polarization plate 442A and a correcting plate holding frame 4462 as a second holding frame for holding the visual-angle correcting plate 444. The polarization plate holding frame 4461 and the correcting plate holding frame 4462 are integrally formed in a manner that the incident-side polarization plate 442A and the visual-angle correcting plate 444 can be adjusted independently.

Figure 7:
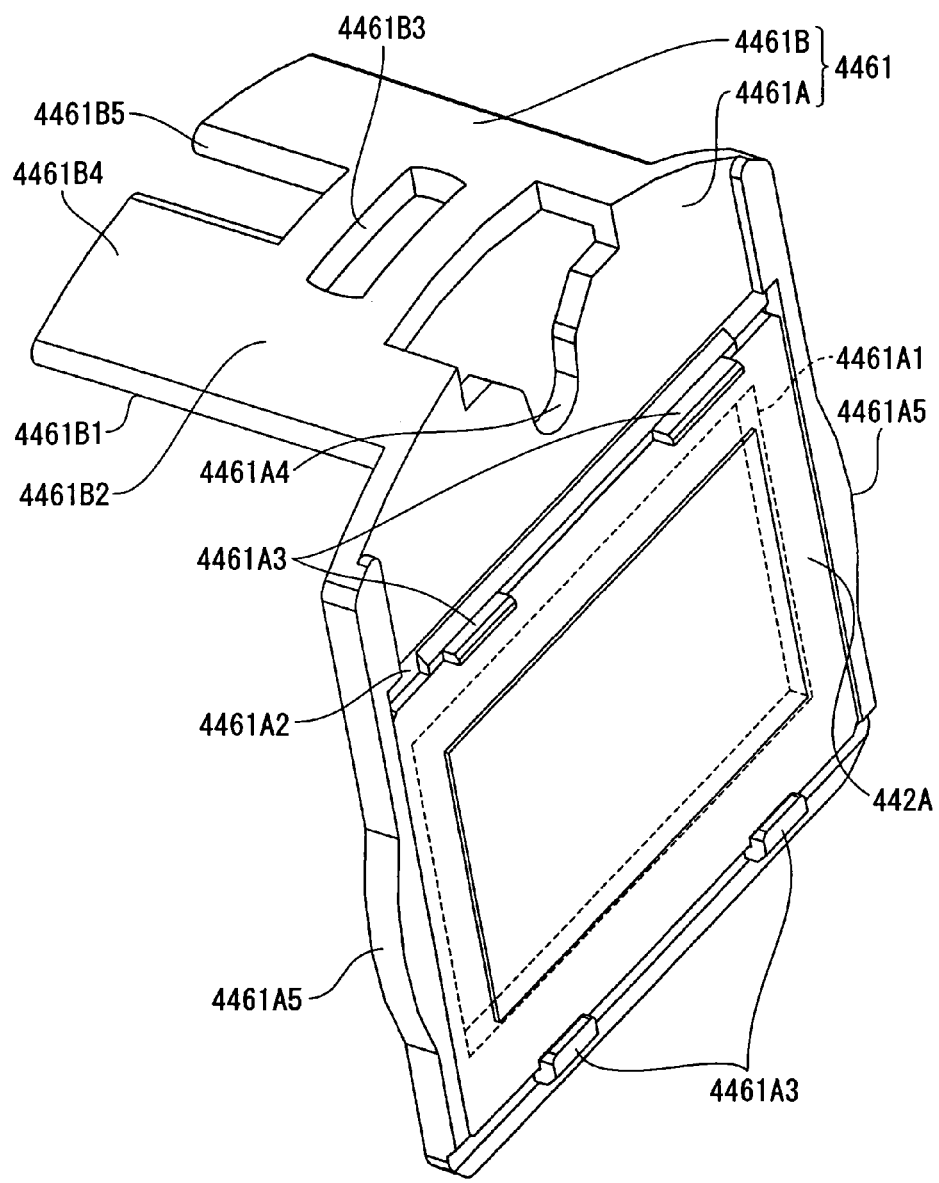
FIG. 7 is a perspective view showing the upper side of a polarization plate holding frame of the aforesaid embodiment.

FIG. 7 is a perspective view showing the upper side of the polarization plate holding frame 4461.

As shown in FIG. 7, the polarization plate holding frame 4461 includes a substantially rectangular first plate member 4461A and a first holding frame projecting portion 4461B projecting substantially in a normal line direction of the plate surface from the upper edge of the first plate member 4461A, the first plate member 4461A and the first holding frame projecting portion 4461B are integrally formed.

An opening 4461A1 is formed substantially at the center of the first plate member 4461A.

Besides, a recess 4461A2 dented in the thickness direction is formed on the periphery of the opening 4461A1 of the first plate member 4461A. The recess 4461A2 has the same dimension as that of the incident-side polarization plate 442A, and is provided with positioning portions 4461A3 on the upper and lower edges of the recess 4461A2 to project from the first plate member 4461A to the light-irradiation side for functioning as an external position reference plane of the incident-side polarization plate 442A. The position of the incident-side polarization plate 442A is defined relative to the polarization plate holding frame 4461 by fitting the profile to the positioning portions 4461A3, and then held and fixed at a predetermined position of the recess 4461A2 with an adhesive or the like. Without limiting to the above configuration using the adhesive or the like to bond and fix, for instance, such a configuration is available in which projections each having the length greater than the thickness of the incident-side polarization plate 442A are projected from the recess 4461A2, and the projections are bent by heat caulking or the like so that the incident-side polarization plate 442A is fixed to the polarization plate holding frame 4461 by caulking.

Further, an engaging portion 4461A4 is formed substantially at the center of the upper edge of the first plate member 4461A, the engaging portion 4461A4 being cut to form convex portion toward the lower side. The engaging portion 4461A4 is engaged with an externally provided optical axis adjuster (not shown) dedicated to adjust the optical axis.

Further, first bulging portions 4461A5 bulging outward along the plate surface of the first plate member 4461A are formed at the centers of the left and right edges of the first plate member 4461 A. When the polarization plate holding frame 4461 is arranged inside the lower casing 471, the first bulging portions 4461A5 are inserted to grooves (not shown) formed inside the lower casing 471 to restrict the polarization plate holding frame 4461 from moving in a direction along the illumination optical axis set in the lower casing 471. Since the first bulging portions 4461A5 are formed substantially in circular shape in plane view, the polarization plate holding frame 4461 can be rotated smoothly even when being arranged inside the lower casing 471.

The first holding frame projecting portion 4461B projects from the left and right positions of the engaging portion 4461A4 of the first plate member 4461A by predetermined dimensions substantially in a normal line direction to form an H-shape in plane view connecting at the center in the projecting direction. Therefore, the externally provided optical axis adjuster (not shown) can be inserted through the opening at the base end of the first holding frame projecting portion 4461B relative to the first plate member 4461A, so that the engaging portion 4461A4 and the optical axis adjuster can engage with each other.

The first holding frame projecting portion 4461B is curved in a convex shape toward the lower side corresponding to the optical component holding frame supporting surface 4471A (FIG. 4) of the holding frame supporting portion 4471 to be formed substantially circularly when seen from the light-incident side or the light-irradiation side.

The lower end surface of the first holding frame projecting portion 4461B becomes a first curved surface 4461B1 (FIG. 6), and the polarization plate holding frame 4461 is supported by the holding frame supporting portion 4471 with the first curved surface 4461B1 being abutted on the optical component holding frame supporting surface 4471A (FIG. 4) of the holding frame supporting portion 4471. Namely, the polarization plate holding frame 4461 is supported such that the first curved surface 4461B1 can slide on the optical component holding frame supporting surface 4471A (FIG. 4) of the holding frame supporting portion 4471, and can adjust the position of the incident-side polarization plate 442A around the illumination optical axis set inside the optical component casing 47 as the center thereof in a plane orthogonal to the illumination optical axis.

Additionally, the upper end surface of the first holding frame projecting portion 4461B becomes a rotation guiding surface 4461B2 (FIG. 7), and the correcting plate holding frame 4462 is slidably supported on the rotation guiding surface 4461B2.

A track hole 4461B3, which is an elongated hole penetrating from the rotation guiding surface 4461B2 to the first curved surface 4461B1, is formed substantially at the center of the connected part of the first holding frame projecting portions 4461B. The track hole 4461B3 is formed to extend in the sliding direction of the polarization plate holding frame 4461 relative to the holding frame supporting portion 4471.

Further, the tip end of the first holding frame projecting portion 4461B relative to the first plate member 4461A becomes a polarization plate movement operating portion 4461B4 that operates the movement of the polarization plate holding frame 4461. The width of the polarization plate movement operating portion 4461B4 is smaller than the distance between the two rotation restricting portions 4473 (FIG. 4) of the holding frame posture adjuster 447. The position of a cut portion 4461B5 located substantially at the center in the width direction of the polarization movement operating portion 4461B4 corresponds to the position of the adjuster tip supporting portion 4472 (FIG. 4) of the holding frame posture adjuster 447 when the polarization plate holding frame 4461 is arranged on the holding frame supporting portion 4471.

Figure 8:
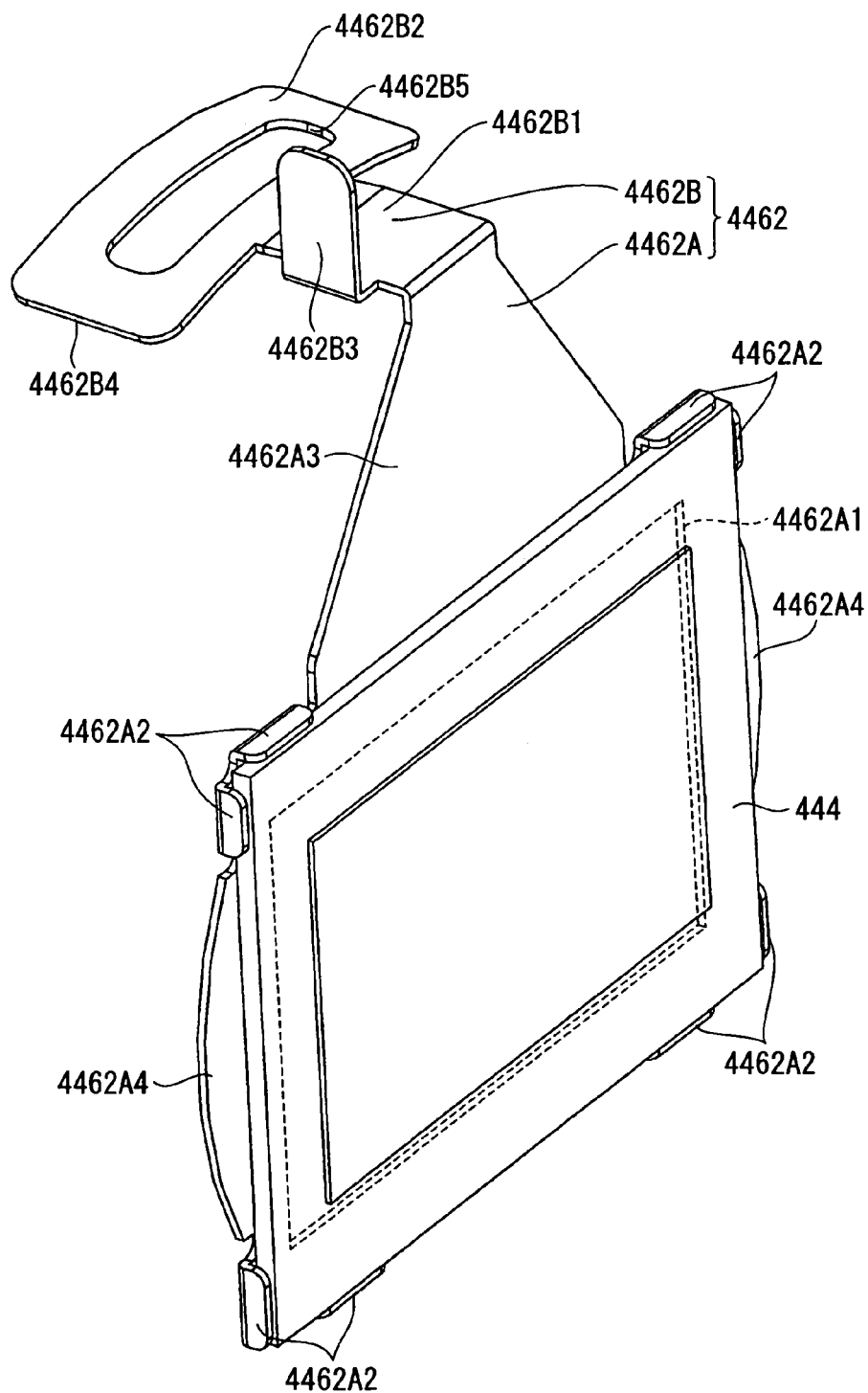
FIG. 8 is a perspective view showing the upper side of a correcting plate holding frame of the aforesaid embodiment.

FIG. 8 is a perspective view showing the upper side of the correcting plate holding frame 4462.

As shown in FIG. 8, the correcting plate holding frame 4462 includes a substantially rectangular second plate member 4462A and a second holding frame projecting portion 4462B projecting substantially in a normal line direction of the plate surface from the upper edge of the second plate member 4462A, the second plate member 4462A and the second holding frame projecting portion 4462B are integrally formed.

An opening 4462A1 is formed substantially at the center of the second plate member 4462A.

Positioning portions 4462A2 are formed at the corners of the upper and lower edges of the second plate member 4462A to project to the light-irradiation side from the second plate member 4462A for functioning as an external position reference plane of the visual-angle correcting plate 444. The position of the visual-angle correcting plate 444 is defined relative to the correcting plate holding frame 4462 by fitting the profile to the positioning portions 4462A2, and then held and fixed at a predetermined position of the second plate member 4462A with an adhesive or the like. Without limiting to the above configuration using the adhesive or the like to bond and fix, for instance, such a configuration is available in which projections each having the length greater than the thickness of the visual-angle correcting plate 444 are projected from the upper and lower edges as well as from the left and right edges of the second plate member 4462A, and the projections are bent by heat caulking or the like so that the visual-angle correcting plate 444 is fixed to the correcting plate holding frame 4462 by caulking.

Additionally, an extending portion 4462A3 substantially being triangle in plane view is formed substantially at the center of the upper edge of the second plate member 4462A to extend to the upper side.

Further, second bulging portions 4462A4 bulging outward along the plate surface of the second plate member 4462A are formed substantially at the centers of the left and right edges of the second plate member 4462A. When the correcting plate holding frame 4462 is arranged inside the lower casing 471, the second bulging portions 4462A4 are inserted to grooves (not shown) formed inside the lower casing 471 to restrict the correcting plate holding frame 4462 from moving in a direction along the illumination optical axis set in the lower casing 471. Since the second bulging portions 4462A4 are formed substantially in a circular shape in plane view, the correcting plate holding frame 4462 can be rotated smoothly even when being arranged inside the lower casing 471.

The second holding frame projecting portion 4462B includes a projecting portion 4462B1 projecting from the tip end in the extending direction of the extending portion 4462A3 of the second plate member 4462A by a predetermined dimension substantially in the normal line direction of the second plate member 4462A, and a curved portion 4462B2 extending in left and right directions from the tip end in the projecting direction of the projecting portion 4462B1 and curving to be concave toward the lower side, the second holding frame projecting portion 4462B being formed substantially in a T-shape in plane view.

A correcting plate movement operating portion 4462B3 is formed on the projecting portion 4462B1 as a movement operating portion extending toward the upper side from one of the edges of the projecting portion 4462B (the left edge in FIG. 8).

The curved portion 4462B2 is curved in a convex shape toward the lower side corresponding to the rotation guiding surface 4461B2 (FIG. 7) of the first holding frame projecting portion 4461B to be formed substantially circularly when seen from the light-incident side or the light-irradiation side. The lower end surface of the curved portion 4462B2 becomes a second curved surface 4462B4 (FIG. 6), and the correcting plate holding frame 4462 is supported by the polarization plate holding frame 4461 with the second curved surface 4462B4 being abutted on the rotation guiding surface 4461B2 (FIG. 7) of the polarization plate holding frame 4462. Namely, the correcting plate holding frame 4462 is supported such that the second curved surface 4462B4 can slide on the rotation guiding surface 4461B2 of the polarization plate holding frame 4461, and can adjust the position of the visual-angle correcting plate 444 around the illumination optical axis set inside the optical component casing 47 as the center thereof in a plane orthogonal to the illumination optical axis.

A track hole 4462B5, which is an elongated hole penetrating from the upper end surface of the curved portion 4462B2 to the second curved surface 4462B4, is formed on the curved portion 4462B2. The track hole 4462B5 is formed to extend in the extending direction of the curved portion 4462B2, i.e., in the sliding direction of the correcting plate holding frame 4462 relative to the polarization plate holding frame 4461.

In the state that the polarization plate holding frame 4461 is arranged on the holding frame supporting portion 4471 and besides the correcting plate holding frame 4462 is arranged on the polarization plate holding frame 4461, a part of the track hole 4461B3 is interfered with a part of the track hole 4462B5 in a plane, and consequently, the fixing hole 4471B (FIG. 4) of the holding frame supporting portion 4471 is exposed through the track holes 4461B3 and 4462B5. As shown in FIG. 5 or 6, by inserting a screw 4463 (fixing member) to the track holes 4461B3 and 4462B5 and screwing it with the fixing hole 4471B (FIG. 4), both of the polarization plate holding frame 4461 and the correcting plate holding frame 4462 are fixed on the holding frame supporting portion 4471 by the screw 4463.

The material for the above-described polarization plate holding frame 4461 and the correcting plate holding frame 4462 is not limited particularly, but these components may preferably be constructed by members having heat conductivity for instance. By constructing with heat conductive members, the incident-side polarization plate 442A and the visual-angle correcting plate 444 can radiate, to the polarization plate holding frame 4461 and the correcting plate holding frame 4462, the heat generated due to the light beam irradiated by the light source device 413, thus avoiding the heat deterioration of the incident-side polarization plate 442A and the visual-angle correcting plate 444. For example, the heat conductive member may be metal such as iron-nickel alloy (Invar and 42Ni—Fe etc.), aluminum alloy, magnesium alloy, carbon steel, brass, stainless or the like, or resin with a carbon filler such as carbon fiber and carbon nanotube added thereto (polycarbonate, poly phenylene sulfide, liquid crystal resin etc.).

Figure 9:
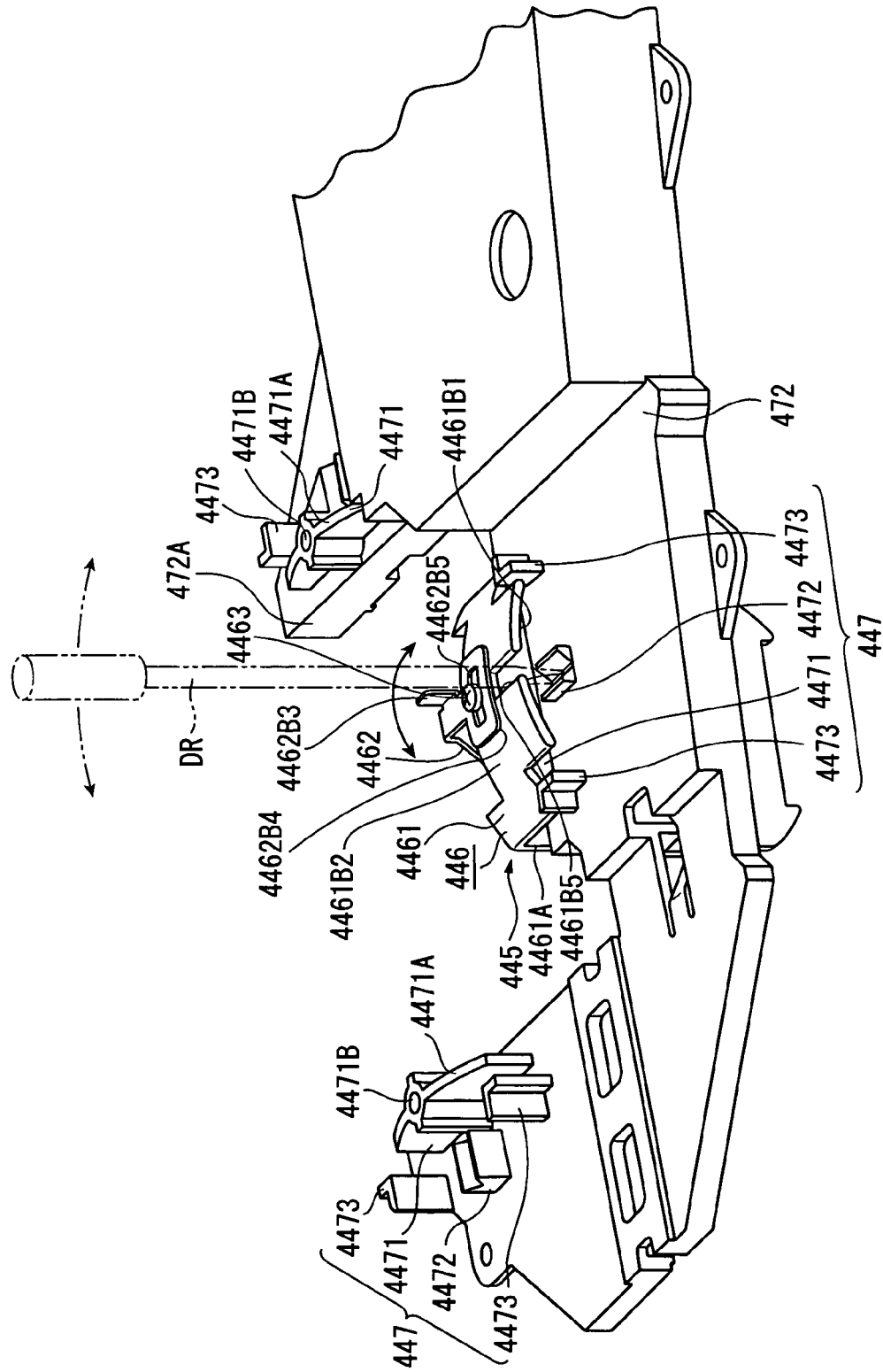
FIG. 9 is an illustration showing operation for adjusting the positions of an incident-side polarization plate and a visual-angle correcting plate according to the aforesaid embodiment.

FIG. 9 is an illustration showing operation for adjusting the positions of the incident-side polarization plate 442A and the visual-angle correcting plate 444.

When the positions of the incident-side polarization plate 442A and the visual-angle correcting plate 444 are adjusted, the first curved surface 4461B1 of the polarization plate holding frame 4461 is abutted on the optical component holding frame supporting surface 4471A of the holding frame supporting portion 4471 to arrange the polarization plate holding frame 4461 on the upper casing 472 while the incident-side polarization plate 442A is held by the polarization plate holding frame 4461. Besides, while the visual angle correcting plate 444 is held by the correcting plate holding frame 4462, the correcting plate holding frame 4462 is arranged on the polarization plate holding frame 4461 so that the second curved surface 4462B4 of the correcting plate holding frame 4462 is abutted on the rotation guiding surface 4461B2 of the polarization plate holding frame 4461.

The screw 4463 is then loosely screwed with the fixing hole 4471B of the holding frame supporting portion 4471 through the track hole 4462B5 of the correcting plate holding frame 4462 as well as the track hole 4461B3 (FIG. 7) of the polarization plate holding frame 4461.

With this state, in order to adjust the position of the incident-side polarization plate 442A, a screwdriver DR having a flat-blade at the tip end thereof is inserted through the cut portion 4461B5 of the polarization plate holding frame 4461 so that the tip end of the screwdriver DR is supported by the valley of the adjuster tip supporting portion 4472.

Then, by moving the screwdriver DR left and right about the tip end of the screwdriver DR as the supporting point, the lateral side of the screwdriver DR is abutted to the edge of the cut portion 4461B5, so that the polarization plate holding frame 4461 slides on the optical component holding frame supporting surface 4471A of the holding frame supporting portion 4471 along the moving direction of the screwdriver DR. As the polarization plate holding frame 4461 slides, the position of the incident-side polarization plate 442A can be adjusted around the illumination optical axis set inside the optical component casing 47 as the center in a plane orthogonal to the illumination optical axis.

Here, since the width of the polarization plate movement operating portion 4461B4 of the polarization plate holding frame 4461 is smaller than the distance between the two rotation posture restricting portions 4473 of the holding frame posture adjuster 447, the polarization plate holding frame 4461 can slide on the optical component holding frame supporting surface 4471A of the holding frame supporting portion 4471. Further, as the end of the polarization plate movement operating portion 4461B4 is abutted on the rotation restricting portion 4473 when the polarization plate holding frame 4461 slides, the terminal position of the polarization plate holding frame 4461 during the movement can be defined.

On the other hand, in order to adjust the position of the visual-angle correcting plate 444, for instance, the correcting plate movement operating portion 4462B3 of the correcting plate holding frame 4462 is gripped by a hand and the correcting plate movement operating portion 4462B3 is then moved left and right, so that the correcting plate holding frame 4462 slides on the rotation guiding surface 4461B2 of the polarization plate holding frame 4461 along the moving direction of the correcting plate movement operating portion 4462B3. As the correcting plate holding frame 4462 slides, the position of the visual-angle correcting plate 444 can be adjusted around the illumination optical axis set inside the optical component casing 47 as the center in a plane orthogonal to the illumination optical axis.

After the positions of the incident-side polarization plate 442A and the visual-angle correcting plate 444 are adjusted, the screw 4463 is screwed to fix both of the polarization plate holding frame 4461 and the correcting plate holding frame 4462 on the upper casing 472 by the screw 4463.

In the present embodiment described above, since the polarization plate holding frame 4461 of the optical component holding frame 446 slides on the optical component holding frame supporting surface 4471A formed on the upper side of the upper casing 472 and is provided with the rotation guiding surface 4461B2 for rotatably supporting the correcting plate holding frame 4462 of the optical component holding frame 446, the polarization plate holding frame 4461 and the correcting plate holding frame 4462 can integrally be formed via the rotation guiding surface 4461B2 so as to hold, by the optical component holding frame 446, the incident-side polarization plate 442A and the visual-angle correcting plate 444 closely arranged. Therefore, in compared to a configuration in which the incident-side polarization plate 442A and the visual-angle correcting plate 444 are independently held by two adjusting mechanisms in a conventional manner, a wide space is not necessary in the optical component casing 47, thus downsizing the optical component casing 47.

Since the correcting plate holding frame 4462 is fixed to the polarization plate holding frame 4461, both of the correcting plate holding frame 4462 and the polarization plate holding frame 4461 can be fixed to the holding frame supporting portion 4471 only with the holding frame supporting portion 4471 provided on the upper casing 472 for holding and fixing the polarization plate holding frame 4461. Accordingly, there is no need to form an attachment for holding and fixing the correcting plate holding frame 4462 on the upper casing 472 or the lower casing 471, thus reducing the production cost of the optical component casing 47.

Since the first curved surface 4461B1 is formed on the polarization plate holding frame 4461 corresponding to the optical component holding frame supporting surface 4471A of the upper casing 472, the polarization plate holding frame 4461 can be rotated along the optical component holding frame supporting surface 4471A, thereby adjusting the position of the incident-side polarization plate 442A easily and highly accurately with a simple structure.

Since the rotation guiding surface 4461B2 is formed on the end surface facing to the first curved surface 4461B1, the curved internal end surface thereof forms the first curved surface 4461B1 and the curved external end surface thereof forms the rotation guiding surface 4461B2 by forming the first holding frame projecting portion 4461B in a curved shape around the illumination optical axis of the light beam as the center, thereby easily manufacturing the polarization plate holding frame 4461.

Since the optical component holding frame supporting surface 4471A is formed on the upper side of the upper casing 472, and the rotation guiding surface 4461B2 is formed on the end surface of the polarization plate holding frame 4461 so as to face to the first curved surface 4461B1 abutting on the optical component holding frame supporting surface 4471A, the polarization plate holding frame 4461 can easily be arranged relative to the upper casing 472 from the upper side of the upper casing 472, whereas the correcting plate holding frame 4462 can easily be arranged relative to the polarization plate holding frame 4461 from the upper side of the polarization plate holding frame 4461. Accordingly, the optical component holding frame 446 can easily be attached and detached relative to the upper casing 472, and consequently, the incident-side polarization plate 442A and the visual-angle correcting plate 444 held by the optical component holding frame 446 can easily be replaced.

Since the second curved surface 4462B4 is formed on the correcting plate holding frame 4462 corresponding to the rotation guiding surface 4461B2 of the polarization plate holding frame 4461, the correcting plate holding frame 4462 can be rotated along the rotation guiding surface 4461B2 of the polarization plate holding frame 4461, thus adjusting the position of the visual-angle correcting plate 444 easily and highly accurately with a simple structure.

The track holes 4461B3 and 4462B5 are respectively formed on the polarization plate holding frame 4461 and the correcting plate holding frame 4462, so that at least a part of the track hole 4461B3 is interfered with a part of the track hole 4462B5 in a plane. Additionally, the fixing hole 4471B for attaching the screw 4463 inserted through the track holes 4461B3 and 4462B5, is formed on the optical component holding frame supporting surface 4471A of the upper casing 472. Owing to this, both of the polarization plate holding frame 4461 and the correcting plate holding frame 4462 can be fixed with the single screw 4463, and the holding frames 4461 and 4462 can be fixed on the upper casing 472 at the optimum position for the incident-side polarization plate 442A or the visual-angle correcting plate 444 in accordance with the rotation of the holding frames 4461 and 4462.

Since the polarization plate holding frame 4461 and the correcting plate holding frame 4462 are fixed on the upper casing 472 due to the screwing structure of the screw 4463 and the fixing hole 4471B, for instance, even when the incident-side polarization plate 442A or the visual-angle correcting plate 444 is displaced from the predetermined position on the illumination optical axis, the position of the incident-side polarization plate 442A or the visual-angle correcting plate 444 can easily be adjusted by loosing the screw 4463. Further, the incident-side polarization plate 442A or the visual-angle correcting plate 444 can be replaced only by loosing the screw 4463 and removing it, thus attaching and detaching the holding frames 4461 and 4462 easily. Accordingly, in compared with a configuration in which the holding frames 4461 and 4462 are bonded and fixed on the upper casing 472 with the adhesive etc., the holding frames 4461 and 4462 can be attached and detached easily and quickly relative to the upper casing 472.

Since the track holes 4461B3 and 4462B5 are respectively formed on the holding frames 4461 and 4462, the positions of the incident-side polarization plate 442A and the visual-angle correcting plate 444 can be adjusted with the screw 4463 loosen, thereby easily adjusting the positions of the incident-side polarization plate 442A and the visual-angle correcting plate 444 and fixing them after the position adjustment easily and tightly.

Since the adjuster tip supporting portion 4472 is formed on the upper casing 472 and the cut portion 4461B5 is formed on the polarization plate holding frame 4461, the lateral side of the screwdriver DR is abutted on the edge of the cut portion 4461B5, the polarization plate holding frame 4461 is moved in the moving direction of the screwdriver DR, and the polarization plate holding frame 4461 is slid on the optical component holding frame supporting surface 4471A by moving the screwdriver DR around the adjuster tip supporting portion 4472 with the tip end of the screwdriver DR being supported by the adjuster tip supporting portion 4472. Accordingly, even though the optical axis adjuster dedicated to move the polarization plate holding frame 4461 is not used, the position of the incident-side polarization plate 442A can easily be adjusted.

Since the correcting plate movement operating portion 4462B3 is formed on the correcting plate holding frame 4462, for instance, by gripping the correcting plate movement operating portion 4462B3 by a hand and moving the correcting plate movement operating portion 4462B3, the correcting plate holding frame 4462 can slide on the rotation guiding surface 4461B2 of the correcting plate holding frame 4462. Accordingly, even though the optical axis adjuster dedicated to move the correcting plate holding frame 4462 is not used, the position of the visual-angle correcting plate 444 can easily be adjusted.

Since the polarization plate holding frame 4461 holds the incident-side polarization plate 442A and the correcting plate holding frame 4462 holds the visual-angle correcting plate 444, the angle of the polarization axis of the incident-side polarization plate 442A can be adjusted relative to the irradiation-side polarization plate 442B by rotating the polarization plate holding frame 4461 relative to the upper casing 472, and also the visual field angle of the visual-angle correcting plate 444 can be adjusted by rotating the correcting plate holding frame 4462 relative to the polarization plate holding frame 4461. Accordingly, the optical unit 4 can form an optical image with high contrast and appropriate visual field angle.

Further, since the projector 1 is a three-plate projector provided with the three liquid crystal panels 441R, 441G and 441B, high-contrast ratio can be provided and unevenness on a screen due to visual field angle dependency generated at each of the liquid crystal panels 441R, 441G and 441B can be restricted to form an evenly colored projected image, by adjusting the positions of the incident-side polarization plate 442A and the visual-angle correcting plate 444.

Modifications of Embodiment

The preferable embodiment of the present invention has been described above, however, the scope of the present invention is not restricted to the above-described embodiment, but includes modifications and improvements as long as an object of the present invention can be achieved.

In the above embodiment, while the polarization plate holding frame 4461 (first holding frame) holds the incident-side polarization plate 442A and the correcting plate holding frame 4462 (second holding frame) holds the visual-angle correcting plate 444, the first holding frame and the second holding frame may respectively hold other two optical components closely arranged with each other. For example, the optical component may be the irradiation-side polarization plate 442B, a phase difference plate, a color correction film or the like other than the incident-side polarization plates 442A and the visual-angle correcting plate 444.

In the above embodiment, while the rotation guiding surface 4461B2 of the polarization plate holding frame 4461 is formed on the end surface facing to the first curved surface 4461B1 of the first holding frame projecting portion 4461B, it may be formed at other position. For example, a projection projecting from the light-irradiation surface of the first plate member 4461A and a rotation guiding surface is formed on the end surface along the projecting direction of this projection. Then, a hole is formed on the correcting plate holding frame 4462 corresponding to the projection, so that the inner periphery of the hole is defined as a second curved surface.

In the above embodiment, while the first curved surface 4461B1 and the rotation guiding surface 4461B2 are formed on the polarization plate holding frame 4461 whereas the second curved surface 4462B4 is formed on the correcting plate holding frame 4462, it is not limited thereto. For example, the first curved surface 4461B1 described in the above embodiment is formed on the correcting plate holding frame 4462 as well as a projection projecting from the light-incident surface of the second plate member 4462A of the correcting plate holding frame 4462, so that a rotation guiding surface is formed on the end surface along the projecting direction of the projection. Then, a hole is formed on the polarization plate holding frame 4461 corresponding to the projection, so that the inner periphery of the hole is defined as a second curved surface.

In the above embodiment, while the screwdriver DR is applied to the adjuster, it is not limited thereto. That is, the adjuster is only required to be a stick-shaped member. With this configuration, since various types of stick-shaped members can adjust the position of the optical component without limiting to the screwdriver DR, the position of the optical component can further easily be adjusted.

In the above embodiment, while the polarization plate holding frame 4461 and the correcting plate holding frame 4462 are manually moved with the use of the screwdriver DR or the like, an exclusive optical axis adjuster may be used. Namely, it can be selected whether the positions of the incident-side polarization plate 442A and the visual-angle correcting plate 444 are adjusted manually with the use of the screwdriver DR or the like, or are adjusted by using the exclusive optical axis adjuster according to the amount of the adjustment. When the polarization plate holding frame 4461 is moved by the optical axis adjuster, a part of the optical axis adjuster may be engaged with the engaging portion 4461A4 of the polarization plate holding frame 4461. On the other hand, when the correcting plate holding frame 4462 is moved by the optical axis adjuster, a part of the optical axis adjuster may be engaged with the correcting plate movement operating portion 4462B3, or an engaging portion may be formed on the correcting plate holding frame 4462 similarly to the engaging portion 4461A4, so that the part of the optical axis adjuster is engaged with that engaging portion.

In the above embodiment, while the screw 4463 is employed as the fixing member and the fixing hole 4471B has the screwing structure, it is not limited thereto. For example, a pin member may be employed as the fixing member, and the fixing hole 4471B may be formed in a shape fitting to the pin member. In this case, the positions of the incident-side polarization plate 442A and the visual-angle correcting plate 444 are adjusted while the pin member is fitted to the fixing hole 4471B through the track holes 4461B3 and 4462B5 of the polarization plate holding frame 4461 and the correcting plate holding frame 4462. Then, after the position of the incident-side polarization plate 442A or the visual-angle correcting plate 444 is adjusted, the polarization plate holding frame 4461 is bonded and fixed on the upper casing 472 by the adhesive etc., and the correcting plate holding frame 4462 is bonded and fixed on the polarization plate holding frame 4461.

In the above embodiment, while the projector 1 with the three liquid crystal panels 441 has been described, it is not limited thereto. For example, a projector with one, two or more than three liquid crystal panels is available.

In the above embodiment, while the optical unit 4 has substantially a U-shape in plane view, other profiles, for instance, an L-shaped in plane view may be employed.

In the above embodiment, while a transmissive optical modulator having different light-incident side and light-irradiation side is used, a reflective optical modulator having common light-incident side and light-irradiation side may be used.

In the above embodiment, while a front-type projector that projects an image in a direction for observing a screen is taken as an example, the present invention may be applied to a rear-type projector that projects an image in a direction opposite to the direction for observing the screen.

Although the best configuration for implementing the present invention is disclosed above, the present invention is not restricted thereto. That is, the present invention is mainly illustrated and described on the specific embodiment, however, a person skilled in the art can modify the specific configuration such as shape, material, quantity on the above-described embodiment as long as a technical idea and an object of the present invention can be achieved.

Therefore, the description that limits the shape and the material is only the example to make the present invention easily understood, but does not intend to limit the present invention, so that the present invention includes the description using a name of component without a part of or all of the limitation on the shape and the material etc.

The priority application Number JP2003-356205 upon which this patent application is based is hereby incorporated by reference.

What is claimed is:

1. An optical component casing with an illumination optical axis of a light beam irradiated by a light source being set therein, in which a plurality of optical components are housed and arranged at predetermined positions on the illumination optical axis, the casing comprising:
    a lower casing in which the plurality of optical components are housed;
    a lid-shaped upper casing that closes the lower casing;
    an optical component holding frame that holds at least one of the plurality of optical components and arranges the optical component at a predetermined position inside the lower casing, wherein
    an optical component holding frame supporting surface, which is a curved surface being circular around the illumination optical axis of the light beam as the center to rotatably support the optical component holding frame, is formed on an upper side of the upper casing,
    the optical component holding frame includes a first holding frame for holding one of the plurality of optical components and a second holding frame for holding the other optical component arranged closely to the optical component held by the first holding frame, and
    the one of the first and second holding frames slides on the optical component holding frame supporting surface of the upper casing, is formed as a curved surface being circular around the illumination optical axis of the light beam as the center, and has a rotation guiding surface that rotatably supports the other one holding frame.

2. The optical component casing according to claim 1, wherein
    a first curved surface is formed on the one holding frame, the first curved surface abutting on the optical component holding frame supporting surface of the upper casing to rotate the optical component around a light-incident direction of the optical component held by the one holding frame as an axis, and
    the rotation guiding surface is formed on an end surface facing to the first curved surface.

3. The optical component casing according to claim 1, wherein a second curved surface is formed on the other holding frame, the second curved surface abutting on the rotation guiding surface of the one holding frame to rotate the optical component around a light-incident direction of the optical component held by the other holding frame as an axis.

4. The optical component casing according to claim 1, wherein
    elongated holes are respectively formed on the first holding frame and the second holding frame to extend along a rotating direction with at least parts of elongated holes being interfered with each other in a plane, and
    a fixing member attachment for attaching a fixing member inserted through the elongated holes for fixing both of the first holding frame and the second holding frame is formed on the optical component holding frame supporting surface of the upper casing.

5. The optical component casing according to claim 4, wherein the fixing member is attached to the fixing member attachment by a screwing structure.

6. The optical component casing according to claim 1, wherein
    an adjuster tip supporting portion that supports a tip end of a stick-shaped adjuster for adjusting the position of the optical component is formed on the upper side of the upper casing as a supporting point when the adjuster moves, and a cut portion, to which the adjuster is inserted and a lateral side of the adjuster is abutted, is formed on the one holding frame.

7. The optical component casing according to claim 1, wherein a movement operating portion is formed on the other holding frame, the movement operating portion projecting upward for sliding the other holding frame on the rotation guiding surface of the one holding frame.

8. An optical device, comprising:
a plurality of optical components arranged on an optical path of a light beam irradiated by a light source; and
an optical component casing in which the plurality of optical components are housed,
the optical component casing, including:
a lower casing in which the plurality of optical components are housed;
a lid-shaped upper casing that closes the lower casing;
an optical component holding frame that holds at least one of the plurality of optical components and arranges the optical component at a predetermined position inside the lower casing, wherein
an optical component holding frame supporting surface, which is a curved surface being circular around an illumination optical axis of the light beam as the center to rotatably support the optical component holding frame, is formed on an upper side of the upper casing,
the optical component holding frame includes a first holding frame for holding one of the plurality of optical components and a second holding frame for holding the other optical component arranged closely to the optical component held by the first holding frame,
the one of the first and second holding frames slides on the optical component holding frame supporting surface of the upper casing, is formed as a curved surface being circular around the illumination optical axis of the light beam as the center, and has a rotation guiding surface that rotatably supports the other holding frame.

9. The optical device according to claim 8, wherein
the plurality of optical components includes:
an optical modulator that modulates the light beam irradiated by the light source in accordance with image information;
a polarization plate that converts a polarization axis of the incident light beam; and
an optical compensation section that enlarges visual field angle of the light beam irradiated from the optical modulator, and wherein
the optical component holding frame holds the polarization plate and the optical compensation section.

10. A projector, comprising:
a light source;
an optical modulator that forms an optical image by modulating a light beam irradiated by the light source in accordance with image information;
a projection optical device that projects the optical image formed by the optical modulator in an enlarged manner; and
an optical component casing in which the optical modulator and the projection optical device are housed,
the optical component casing, including:
a lower casing in which a plurality of optical components are housed;
a lid-shaped upper casing that closes the lower casing;
an optical component holding frame that holds at least one of the plurality of optical components and arranges the optical component at a predetermined position inside the lower casing, wherein
an optical component holding frame supporting surface, which is a curved surface being circular around an illumination optical axis of the light beam as the center to rotatably support the optical component holding frame, is formed on an upper side of the upper casing,
the optical component holding frame includes a first holding frame for holding one of the plurality of optical components and a second holding frame for holding the other optical component arranged closely to the optical component held by the first holding frame, and
the one of the first and second holding frames slides on the optical component holding frame supporting surface of the upper casing, is formed as a curved surface being circular around the illumination optical axis of the light beam as the center, and has a rotation guiding surface that rotatably supports the other holding frame.

11. The projector according to claim 10, wherein
a first curved surface is formed on the one holding frame, the first curved surface abutting on the optical component holding frame supporting surface of the upper casing to rotate the optical component around a light-incident direction of the optical component held by the one holding frame as an axis, and
the rotation guiding surface is formed on an end surface facing to the first curved surface.

12. The projector according to claim 10, wherein a second curved surface is formed on the other holding frame, the second curved surface abutting on the rotation guiding surface of the one holding frame to rotate the optical component around a light-incident direction of the optical component held by the other holding frame as an axis.

13. The projector according to claim 10, wherein
elongated holes are respectively formed on the first holding frame and the second holding frame to extend along a rotating direction with at least parts of elongated holes being interfered with each other in a plane, and
a fixing member attachment for attaching a fixing member inserted through the elongated holes for fixing both of the first holding frame and the second holding frame is formed on the optical component holding frame supporting surface of the upper casing.

14. The projector according to claim 13, wherein the fixing member is attached to the fixing member attachment by a screwing structure.

15. The projector according to claim 10, wherein
an adjuster tip supporting portion that supports a tip end of a stick-shaped adjuster for adjusting the position of the optical component is formed on the upper side of the upper casing as a supporting point when the adjuster moves, and
a cut portion, to which the adjuster is inserted and a lateral side of the adjuster is abutted, is formed on the one holding frame.

16. The projector according to claim 10, wherein a movement operating portion is formed on the other holding frame, the movement operating portion projecting upward for sliding the other holding frame on the rotation guiding surface of the one holding frame.

17. The projector according to claim 10,
the plurality of optical components, including:
an optical modulator that modulates the light beam irradiated by the light source in accordance with image information;

a polarization plate that converts a polarization axis of the incident light beam; and an optical compensation section that enlarges visual field angle of the light beam irradiated from the optical modulator, wherein the optical component holding frame holds the polarization plate and the optical compensation section.

18. The projector according to claim 17, wherein a first curved surface is formed on the one holding frame, the first curved surface abutting on the optical component holding frame supporting surface of the upper casing to rotate the optical component around a light-incident direction of the optical component held by the one holding frame as an axis, and the rotation guiding surface is formed on an end surface facing to the first curved surface.

19. The projector according to claim 17, wherein a second curved surface is formed on the other holding frame, the second curved surface abutting on the rotation guiding surface of the one holding frame to rotate the optical component around a light-incident direction of the optical component held by the other holding frame as an axis.

20. The projector according to claim 17, wherein elongated holes are respectively formed on the first holding frame and the second holding frame to extend along a rotating direction with at least parts of elongated holes being interfered with each other in a plane, and a fixing member attachment for attaching a fixing member inserted through the elongated holes for fixing both of the first holding frame and the second holding frame is formed on the optical component holding frame supporting surface of the upper casing.

21. The projector according to claim 20, wherein the fixing member is attached to the fixing member attachment by a screwing structure.

22. The projector according to claim 17, wherein an adjuster tip supporting portion that supports a tip end of a stick-shaped adjuster for adjusting the position of the optical component is formed on the upper side of the upper casing as a supporting point when the adjuster moves, and a cut portion, to which the adjuster is inserted and a lateral side of the adjuster is abutted, is formed on the one holding frame.

23. The projector according to claim 17, wherein a movement operating portion is formed on the other holding frame, the movement operating portion projecting upward for sliding the other holding frame on the rotation guiding surface of the one holding frame.

* * * * *